United States Patent [19]
Dinkel

[11] Patent Number: 5,993,708
[45] Date of Patent: Nov. 30, 1999

[54] DECORATIVE HEAT TEXTURING PROCESS FOR PLASTIC PIECES

[75] Inventor: Steven B. Dinkel, Fort Myers, Fla.

[73] Assignee: U.S. Sign and Mill Corporation, Fort Myers, Fla.

[21] Appl. No.: 09/035,634

[22] Filed: Mar. 4, 1998

Related U.S. Application Data

[60] Provisional application No. 60/039,507, Mar. 4, 1997.

[51] Int. Cl.[6] .................................................. B29C 35/02
[52] U.S. Cl. ........................... 264/80; 264/129; 264/154; 264/321
[58] Field of Search ............................. 264/154, 80, 129, 264/321

[56] References Cited

U.S. PATENT DOCUMENTS

| | | | |
|---|---|---|---|
| 2,582,798 | 1/1952 | Russell et al. | 264/154 |
| 2,763,759 | 9/1956 | Mito et al. | 264/154 |
| 2,896,840 | 7/1959 | Hendry | 264/154 |
| 3,054,148 | 9/1962 | Zimmerli | 264/154 |
| 3,092,439 | 6/1963 | Harrison | 264/154 |
| 3,361,607 | 1/1968 | Bruno | 264/80 |
| 3,454,413 | 7/1969 | Miller | 264/80 |
| 3,793,424 | 2/1974 | Haga | 264/154 |
| 3,808,301 | 4/1974 | Pruden | 264/80 |
| 3,949,037 | 4/1976 | Volent | 264/129 |
| 4,061,702 | 12/1977 | Kessler | 264/154 |
| 4,070,429 | 1/1978 | Uhlig | 264/154 |
| 4,113,824 | 9/1978 | Matsui et al. | 264/321 |
| 4,230,662 | 10/1980 | Barnsbee | 264/154 |
| 4,247,663 | 1/1981 | Yoshiga et al. | 264/288.4 |
| 4,373,211 | 2/1983 | Goudreau et al. | 2/2 |
| 5,078,948 | 1/1992 | Troutman et al. | 264/154 |
| 5,104,607 | 4/1992 | Driska | 264/536 |
| 5,512,226 | 4/1996 | Rosica et al. | 264/154 |

*Primary Examiner*—Allan R. Kuhns
*Attorney, Agent, or Firm*—William E. Noonan

[57] ABSTRACT

A method of forming a decorative surface texture on a plastic component is disclosed. A planar component, composed of PVC or other plastic material, is cut and routed according to a desired size and shape. The plastic component is then heated to a temperature and for a duration such that the upper and lower surfaces of the panel shrink and the corners or edges of the panel, as well as its cut portions, melt. This produces an antique effect on the surface of the plastic component.

8 Claims, 2 Drawing Sheets

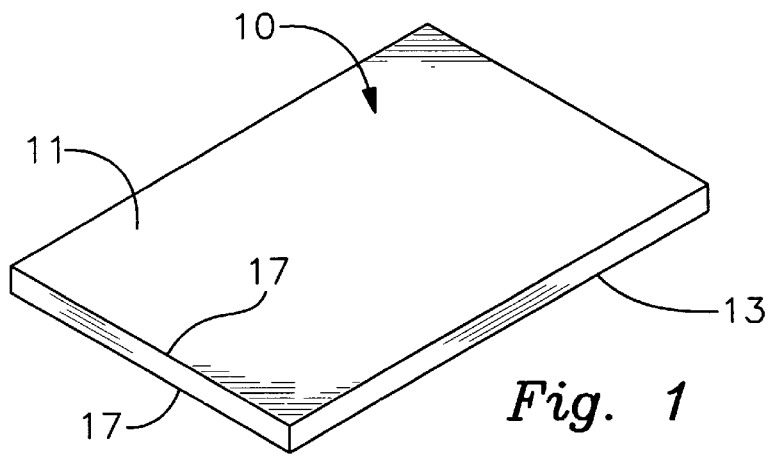
Fig. 1
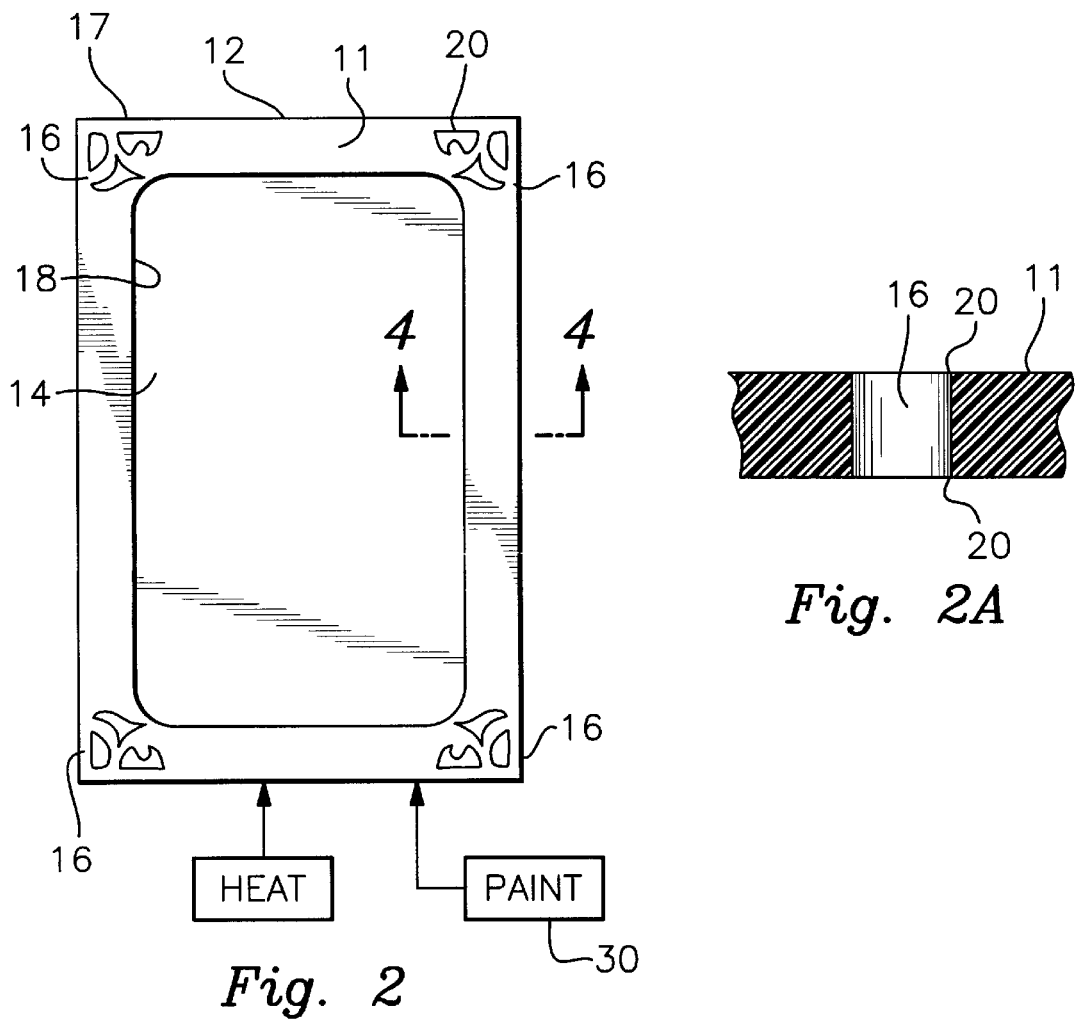
Fig. 2
Fig. 2A

DECORATIVE HEAT TEXTURING PROCESS FOR PLASTIC PIECES

RELATED APPLICATION

This application claims the benefit of U.S. Provisional Application Ser. No. 60/039,507 filed on Mar. 4, 1997.

FIELD OF THE INVENTION

This invention relates to a process for heat treating decorative PVC components such that an antique texture is formed on and about the edges of the components.

BACKGROUND OF THE INVENTION

Antique furniture and other pieces having an antique appearance are extremely popular. Normally, such pieces are composed of wood or metal. Genuine antiques can be very expensive. Alternatively, creating an antique facade an be a time-consuming and expensive procedure. To date, antique furniture, accessories and other pieces have not been available in an inexpensive plastic and no process is available for antiquing plastic pieces.

SUMMARY OF INVENTION

It is therefore an object of the present invention to provide a technique for quickly, conveniently, inexpensively and reliably forming an attractive decorative texture on a plastic component.

It is a further object of this invention to provide a quick, inexpensive and effective technique for producing an antique appearance on furniture, accessories and decorative components such as frames.

It is a further object of this invention to provide a plastic component having a very attractive and unique antique surface texture.

This invention results from a realization that a PVC panel or similar plastic component may be cut with a desired design and then heated to form an antique surface texture on the component. In particular, the invention features a method for forming a decorative surface texture on a plastic component. A plastic component having substantially flat upper and lower surfaces is obtained. A desired cut out pattern, which extends from the upper surface to the lower surface, is formed in the plastic component. The plastic component is heated to a predetermined temperature and for a selected duration such that the corner or edges formed in the component melt and become rounded. In response to heating, the flat upper and lower surfaces of the plastic piece contract or shrink to help produce the rounded effect about the edges of the piece.

In a preferred embodiment, the plastic component comprises a panel or sheet of polyvinylchloride (PVC). These panels are conventionally provided in 4'×8' sheets of recycled PVC. In alternative embodiments, the plastic may comprise a foam material. The pattern or design is cut or otherwise formed in the sheet by appropriate means such as a router.

The plastic component may be heated by various means including torches, ovens and other types of heating devices. A torch may be directed at the flat upper and lower surfaces, respectively, to shrink those surfaces, melt the corners, and create the antique texture effect. Alternatively, ambient heating may be performed, such as in a kiln or oven. The plastic component is heated to at least its melting point. Preferably, this is a minimum of 400–450 degrees Fahrenheit. The plastic component is heated for a variable time. Higher heating temperatures require less time and lower heating temperatures typically require a longer time to produce the required effect.

After heating is completed, the plastic component typically remains in a relatively soft, pliable condition until it cools. During this period, the plastic may be manipulated and formed so that desired configurations and designs are achieved. The completed, cooled product may be painted with an appropriate coating such as an antique, white-wash or copper simulating paint.

DETAILED DESCRIPTION OF PREFERRED EMBODIMENTS

Other objects, features and advantages will occur from the following description of preferred embodiments and the accompanying drawings, in which:

FIG. 1 is a perspective view of a plastic (PVC) panel of the type used in practicing the method of this invention;

FIG. 2 is a front elevational, partly schematic view of a decorative frame that is formed from the panel of FIG. 1 and to which heat and paint are applied to achieve the decorative surface texturing effect of this invention;

FIG. 2A is a cross sectional view of one of the cut-out openings routed in the frame;

Figure 3:
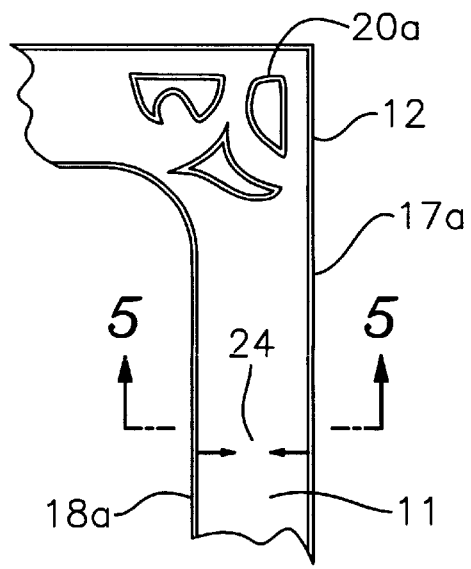
FIG. 3 is a view of one corner of the frame after that corner has been heated to achieve the decorative antique surface texture.

There is shown in FIG. 1 a generally flat panel 10 composed of recycled PVC plastic. Panels of this type are widely available and typically supplied in 4'×8' sheets. The panel may be cut by a conventional saw or cutter into smaller sizes and shapes. Panel 10 includes a flat upper surface 11 and a similar flat surface 13 on the other side of the panel.

Panel 10 is provided with a unique decorative design and surface texture according to the following method. Initially, the panel is cut and formed into a desired configuration and design. For example, in FIG. 2, a decorative frame 12 is formed. This is accomplished by first cutting panel 10, FIG. 1, to a desired length and width. An interior opening 14 is cut into frame 12 by appropriate means such as a saw or router. A router also forms decorative cut-out openings 16 in each of the corners of frame 12. Interior opening 14 and cut-out openings 16 extend completed through frame 12 from upper surface 11 to the lower surface 13 (FIG. 1) on the opposite side of the frame. When the frame is initially formed, it includes a sharp outer peripheral edge or corner 17 (FIGS. 1, 2 and 5) that extends about both the front and back flat surfaces of the frame. Likewise, a sharp inner peripheral edge or corner 18 (FIG. 1, 2 and 5) extends about interior opening 14 both on the upper surface 11 and the rearward surface 13. Sharp edges or corners 20 (FIGS. 2 and 2A) are also formed peripherally about each of the cut-out openings 16. Again, a sharp edge extends about each opening both at the upper surface 11 and rearward surface 13. Immediately after the frame is cut and decorative openings 16 are formed, rough corners or edges are left about each of the openings in the panel. Accordingly, the cut frame is sanded to remove burs and splinters from around the cut openings. As a result, sharp edges remain.

Figures 4, 5:
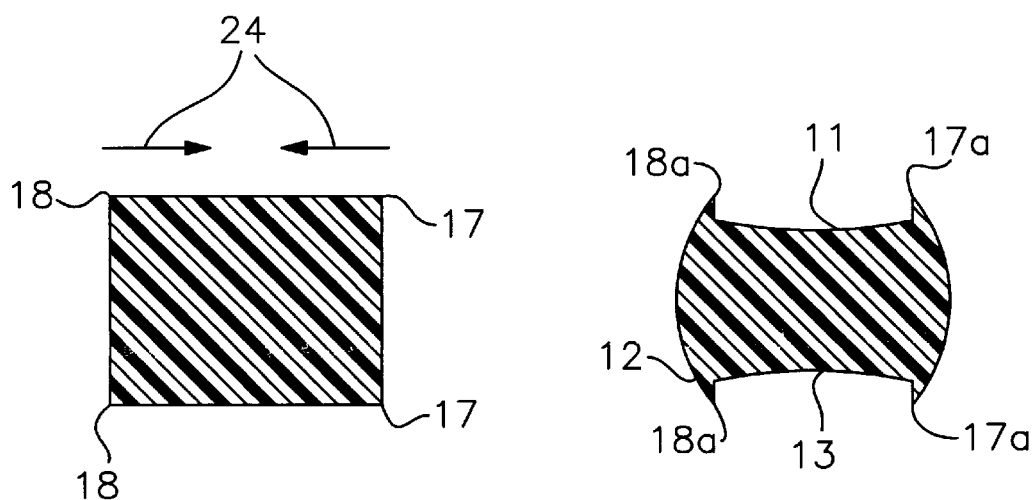
FIG. 4 is a cross sectional view taken along 4—4 of FIG. 2.
FIG. 5 is a cross sectional view taken along line 5—5 of FIG. 3.

After routing is completed and a selected design is obtained, frame 12 is heated. Such heating may be performed by a roofer's torch or similar type of heating apparatus. First, upper side 11 is heated and then frame 12 is rotated so that the opposite side 13 may be heated. Alternatively, the entire frame 12 may be introduced into an oven, kiln or other type of heater. Preferably, the heating is concentrated on the flat upper and lower surfaces of the PVC frame. Eventually, the sharp edges 17, 18 and 20 of frame 12 melt and become rounded in the manner illustrated in FIG. 3. It is believed that upper surfaces 11 and 13 respond to heat by shrinking in the manner indicated by double-headed arrows 24 in FIGS. 3 and 4. As a result, outside and inside edges 17 and 18 of frame 12, as well as peripheral edges 20 of openings 16 melt and are transformed into somewhat raised, rounded corners 17a, 18a and 20a, as depicted in FIGS. 3 and 5. This provides upper and lower surfaces 11 and 13 with the textured appearance illustrated in FIGS. 3 and 5.

Frame 12 should be heated to a temperature and for a duration sufficient to melt the PVC. The time and temperature may be varied within the scope of this invention. Preferably, each of the flat sides 11 and 13 is heated to at least 400–450 degrees Fahrenheit.

After heating is completed and the desired surface texture is obtained, the material in frame 12 remains pliable until it cools. During this period, the frame may be manipulated to shape the frame as required.

After the frame has cooled and the decorative texture has set, the plastic resumes a relatively rigid condition. This simply means that the plastic is more rigid than it is while being heated. A paint 30 is applied to frame 12. This paint may comprise an antique paint, a white-wash or paint that achieves a copper or metallic effect. Various alternative types of coatings may be applied to the frame as desired.

In the embodiments disclosed herein, the PVC panel 10 is formed into a picture or mirror frame containing a plurality of cut-out openings 16. However, it should be understood that in alternative embodiments, the plastic component may be formed into a wide variety of other types of furniture and accessory components. Additionally, an almost endless variety of designs may be formed in the plastic component. In still other alternative embodiments, foam or other types of synthetic material may be substituted for PVC.

It will thus be seen that the objects made apparent from the preceding description are sufficiently obtained and certain changes may be made in the above construction without departing from the scope of the invention. It is intended that all matter contained in the above description and shown in the accompanying drawings be interpreted as illustrative and not in an imitative sense. Although specific features of the invention are shown in some drawings and not others, this is for convenience only as each feature may be combined with any or all of the features in accordance with the invention. Other embodiments, within the scope of this invention, will occur to those skilled in the art.

What is claimed is:

1. A method of forming a decorative surface texture on a plastic component said method comprising:

providing a plastic component having generally opposing surfaces;

forming a decorative opening that extends completely through said plastic component between the opposing surfaces and is bounded by relatively sharp edges;

heating said plastic component to a temperature and for a duration such that said edges of said decorative opening are transformed into a relatively rounded condition;

allowing the heated plastic component to cool from a relatively soft, pliable condition to a relatively rigid condition; and painting said plastic component with one of an antique, white-wash and copper simulating paint when said component has achieved the cooled, relatively rigid condition.

2. The method of claim 1 in which said plastic component includes a sheet of polyvinylchloride.

3. The method of claim 1 in which said plastic component includes a foam material.

4. The method of claim 1 in which said decorative opening is formed by cutting said opening through said plastic component.

5. The method of claim 4 in which said opening is cut by a router.

6. The method of claim 1 in which said plastic component is heated by a torch.

7. The method of claim 1 further including the step of manipulating said plastic component into a desired configuration while said component is cooling and still in the soft, relatively pliable condition.

8. The method of claim 1 in which heat is applied selectively to said opposing surfaces by a torch.

* * * * *